(12) United States Patent
Thomas et al.

(10) Patent No.: US 7,935,173 B1
(45) Date of Patent: May 3, 2011

(54) PROCESS FOR RECOVERY OF PRECIOUS METALS

(75) Inventors: Joseph L. Thomas, Yorba Linda, CA (US); Gerald F. Brem, Chino Hills, CA (US)

(73) Assignee: Metals Recovery Technology Inc., Anaheim, CA (US)

( * ) Notice: Subject to any disclaimer, the term of this patent is extended or adjusted under 35 U.S.C. 154(b) by 0 days.

(21) Appl. No.: 12/842,925

(22) Filed: Jul. 23, 2010

(51) Int. Cl.
 *C22B 3/44* (2006.01)
 *C22B 3/46* (2006.01)

(52) U.S. Cl. .............................. 75/741; 423/22; 423/42

(58) Field of Classification Search .................. 75/741; 423/22, 42
 See application file for complete search history.

(56) References Cited

U.S. PATENT DOCUMENTS

| | | | | |
|---|---|---|---|---|
| 3,929,773 A | | 12/1975 | Yamahara et al. | 260/242 |
| 3,979,207 A | * | 9/1976 | MacGregor | 75/421 |
| 4,012,481 A | | 3/1977 | Baltz et al. | 423/22 |
| 4,041,126 A | | 8/1977 | Baltz et al. | 423/22 |
| 4,058,585 A | | 11/1977 | MacKay et al. | 423/24 |
| 4,107,261 A | | 8/1978 | Baltz et al. | 423/22 |
| 4,113,467 A | | 9/1978 | Harrington | 75/0.5 A |
| 4,135,911 A | | 1/1979 | Balmat | 75/0.5 AB |
| 4,272,288 A | | 6/1981 | Dessau | 75/101 |
| 4,331,634 A | | 5/1982 | Shanton et al. | 423/22 |
| 4,578,250 A | | 3/1986 | Dimmit et al. | 423/22 |
| 4,705,896 A | | 11/1987 | Van Der Puy et al. | 564/265 |
| 4,900,520 A | | 2/1990 | Behnam et al. | 423/22 |
| 5,051,128 A | | 9/1991 | Kubo | 75/712 |
| 5,091,350 A | | 2/1992 | Cornils et al. | 502/24 |
| 5,096,486 A | | 3/1992 | Anderson et al. | 75/734 |
| 5,139,752 A | | 8/1992 | Nakao et al. | 423/27 |
| 5,158,603 A | | 10/1992 | Stierman et al. | 75/743 |
| 5,294,415 A | | 3/1994 | Lappe et al. | 423/22 |

(Continued)

FOREIGN PATENT DOCUMENTS

EP 0049567 A1 4/1982

(Continued)

OTHER PUBLICATIONS

Els et al. The Adsorption of Precious Metals and Base Metals on a Quaternary Ammonium Group Ion Exchange Resin. Minerals Engineering, vol. 13, No. 4, pp. 401-414, 2000.

(Continued)

*Primary Examiner* — George Wyszomierski
*Assistant Examiner* — Tima M McGuthry-Banks
(74) *Attorney, Agent, or Firm* — Connolly Bove Lodge & Hutz LLP

(57) ABSTRACT

A hydrometallurgical process for the recovery of metals selected from the group consisting of platinum, palladium, rhodium, ruthenium, iridium, and gold (PM) from solids includes dissolving the PM and base metals in an acidic halide aqueous solution and precipitating the PM using substituted quaternary ammonium salts (SQAS). PM having multiple oxidation states may be oxidized or reduced to separate through differential solubility. Au-SQAS is separated by washing the precipitate with a suitable organic solvent. Rh-SQAS and other PM with multiple oxidation states are dissolved in a strong halide acid solution and oxidized to separate soluble Rh. Pb and Pd are separated by boiling the initial acidic halide aqueous solution of metals in an excess of SQAS. The Pb and Pd filtrate is oxidized and then Pd-SQAS is dissolved in aqueous ammonia and separated from insoluble Pb. A slurry of Ir-SQAS and Pt-SQAS are separated through dissolution of Ir-SQAS with $NaNO_2$.

20 Claims, 4 Drawing Sheets

U.S. PATENT DOCUMENTS

| | | | |
|---|---|---|---|
| 5,833,937 A | 11/1998 | Kerr | 423/27 |
| 6,139,816 A | 10/2000 | Liu et al. | 423/608 |
| 6,407,298 B1 | 6/2002 | Matsumoto et al. | 570/191 |
| 6,579,504 B1 | 6/2003 | Liddell | 423/22 |
| 6,890,496 B2 | 5/2005 | Singh et al. | 423/22 |
| 7,175,818 B2 | 2/2007 | Singh | 423/22 |
| 7,189,380 B2 | 3/2007 | Singh | 423/22 |
| 7,335,245 B2 | 2/2008 | He et al. | 75/351 |
| 2003/0190274 A1 | 10/2003 | Singh | 423/22 |
| 2003/0200839 A1 | 10/2003 | Jenkins et al. | 75/741 |
| 2004/0200782 A1 | 10/2004 | Singh | 210/749 |
| 2008/0060997 A1 | 3/2008 | Musale et al. | 210/633 |
| 2008/0060999 A1 | 3/2008 | Musale et al. | 210/636 |
| 2009/0263496 A1 | 10/2009 | Kijlstra et al. | 424/600 |

FOREIGN PATENT DOCUMENTS

| | | |
|---|---|---|
| EP | 0183200 A2 | 6/1986 |
| EP | 0445347 A2 | 9/1991 |
| EP | 0970258 B1 | 5/2003 |
| JP | 06287654 A | 10/1994 |
| WO | WO 2005/035804 A1 | 4/2005 |

OTHER PUBLICATIONS

Chen et al. An Effective Hydrothermal Route for the Synthesis of Multiple PDDA-Protected Noble-Metal Nanostructures, Inorg. Chem. 2007, 46, 10587-10593.

Desnoyers et al. Salting-In by Quaternary Ammonium Salts. Canadian Journal of Chemistry, vol. 43 (1965).

Ghezzi et al. Removal and recovery of palladium(II) ions from water using micellar-enhanced ultrafiltration with a cationic surfactant. Colloids and Surfaces A: Physicochem. Eng. Aspects 329 (2008) 12-17.

Singla et al. Catalytic behavior of nickel nanoparticles stabilized by lower alkylammonium bromide in aqueous medium. Applied Catalysis A: General 323 (2007) 51-57.

* cited by examiner

Fig. 1A Example A Processing Diagram

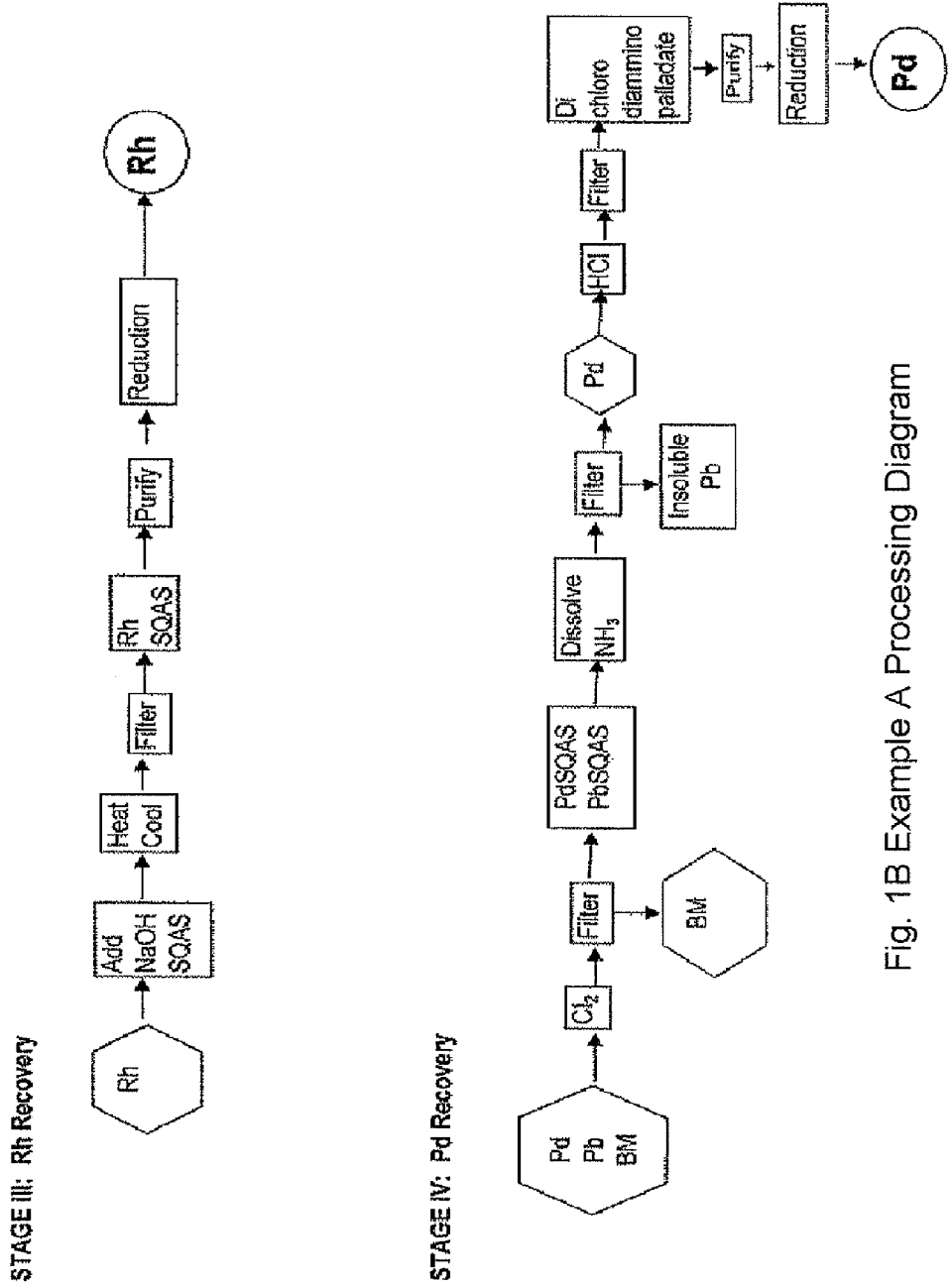
Fig. 1B Example A Processing Diagram

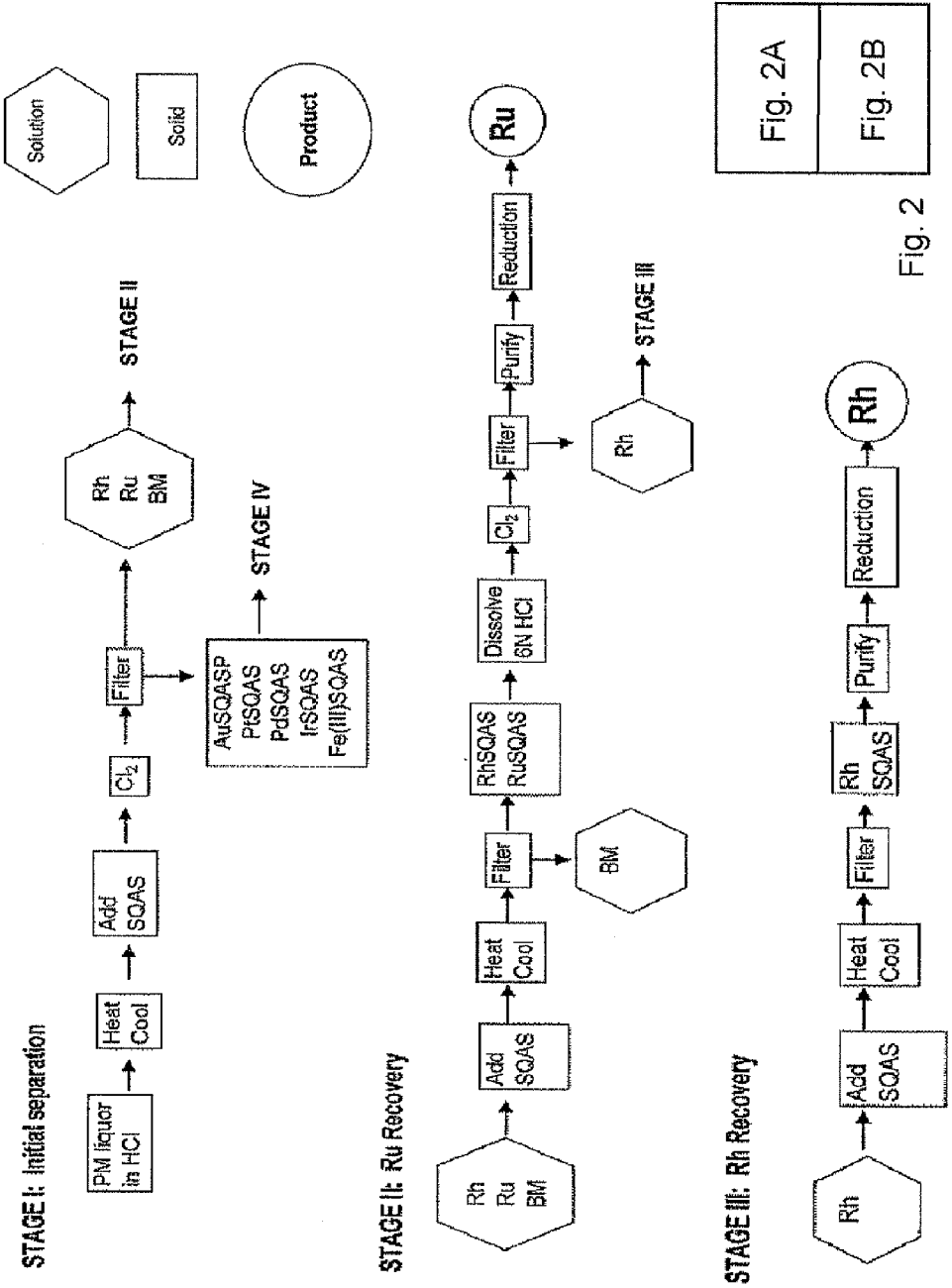

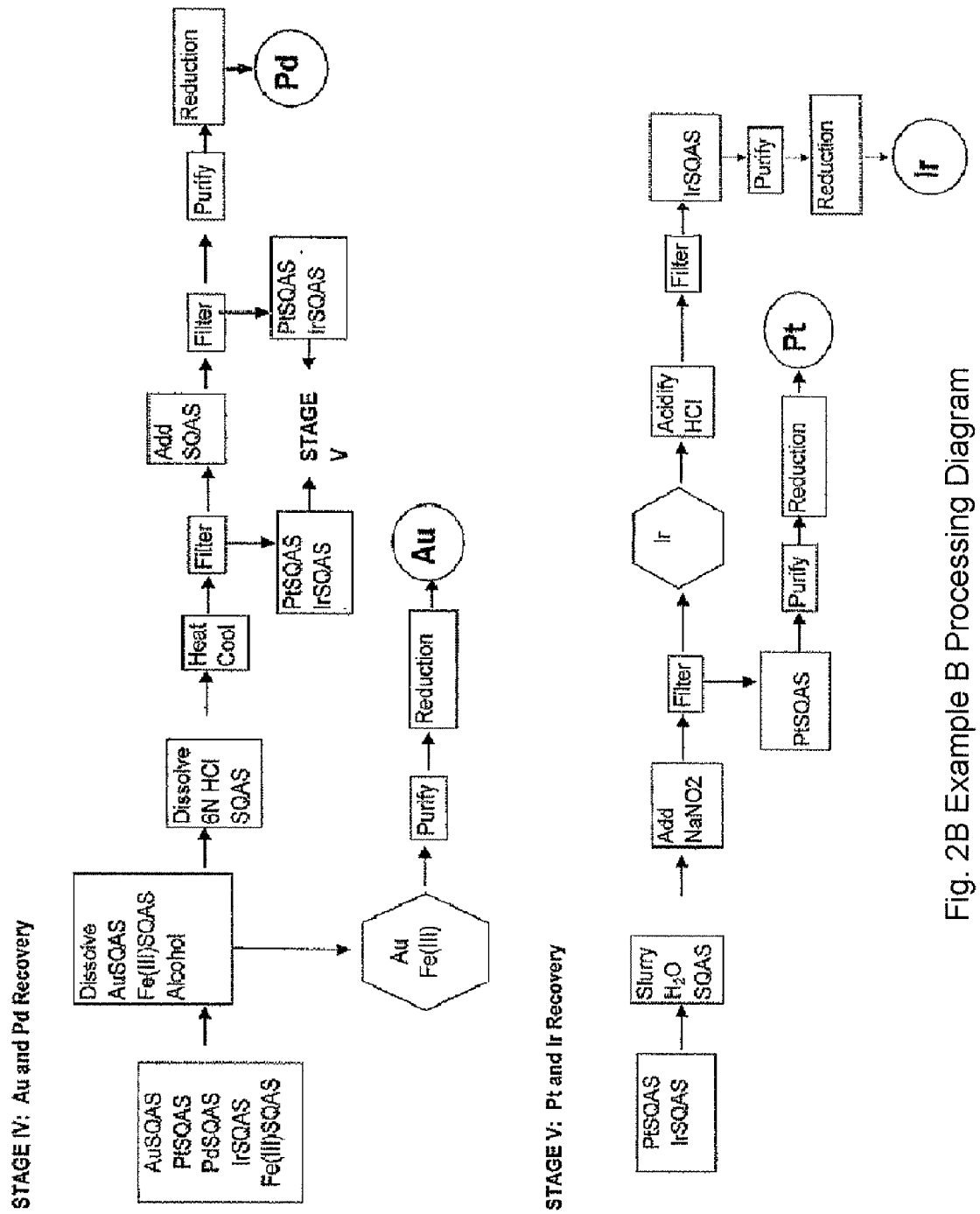
Fig. 2B Example B Processing Diagram

PROCESS FOR RECOVERY OF PRECIOUS METALS

BACKGROUND OF THE INVENTION

The field of the present invention is processes for the separation of elements.

Recovery, separation and purification of valuable precious metals, e.g., platinum [Pt], palladium [Pd], iridium [Ir], rhodium [Rh], ruthenium [Ru] and gold [Au], are typically tedious processes requiring repeated application of pyrometallurgical, hydrometallurgical or electrowinning processes to achieve acceptable metal recovery and metal purity. Most source materials such as ores, spent catalysts, plating solutions, sludges, ore concentrates and smelter mattes are chemically complex, not only because of the diversity of precious metal elements but also because of the presence of large quantities of non-precious metals in the source materials. Recovery, purification and separation of precious metal elements from these source materials are very difficult, time consuming, expensive, and unsatisfactory with respect to some elements, particularly rhodium.

Precious metal chemistry is exceedingly complex and not always well understood. In acidic halogen media, more specifically chloride media, precious metals do not form simple aquated cations of the type formed by common base metals (e.g., $Ni(H_2)^{+2}$). Precious metals form coexisting coordination complexes with a wide variety of ligands. For example known rhodium (III) complexes include $[RhCl_6]^{-3}$, $[RhCl_5(H_2O)]^{-2}$, $[RhCl_4(H_2O)_2]^{-2}$ and $[RhCl_3(H_2O)_3]$. In 1M chloride solution, an equilibrium assemblage comprises about 80% $[RhCl_5(H_2O)]^{-2}$, 10% $[RhCl_6]^{-3}$, 10% $[RhCl_4(H_2O)_2]^{-2}$ and less than about 1% $[RhCl_3(H_2O)_3]$ (See Grant, R. A., 1989, The Separation Chemistry of Rhodium and Iridium, in Manziek, ed., Precious Metals Recovery and Refining, Proceedings of the International Precious Metals Institute, p. 7-41). However, the distribution of coexisting complexes is unlikely to be an equilibrium assemblage, particularly in industrial applications involving multiple precious metals. The kinetics of ligand exchange rates for precious metals exhibit extreme ranges. For example, the relative exchange rate for platinum (IV) is $10^{-12}$ relative to palladium. Whereas palladium could undergo ligand exchange within hours or days, platinum (IV) ligand exchange may take months. It is likely that combined complex precious metal speciation, reaction kinetics and other factors have necessitated development of present-day complex, tedious and time-consuming precious metal recovery protocols that often suffer from disappointing outcomes or expense.

Current industry practice for precious metal recovery relies chiefly on solvent extraction that is typically supplemented by ion exchange and traditional chemical processes in spite of inefficiencies, long processing time, large volumes of solutions and a myriad of other problems. U.S. Pat. Nos. 5,201,942 and 7,291,202 review some of the difficulties related to precious metal recovery and purification. Precious metal recovery and purification processes in these patents as well as U.S. Pat. No. 7,175,818 disclose tedious and complex processes that do not fully solve current limitations or high costs.

The precious metal industry has exerted great effort over the past decades in developing and improving upon solvent extraction processes for gold and some platinum group metals. In spite of substantial progress, protocols typically utilize different extractants for each element. Solvent exchange processes are equilibrium controlled. Each solvent extraction may require multiple contacts of extractant and mother liquid, stripping of the extractant, scrubbing of the extractant to remove impurities and regeneration of the extractant. Therefore, complete extraction of the desired metal may not be achieved and cumulative metal loss can increase with each extraction. In addition, contaminating elements may also be extracted along with the desired metal, thus requiring purification of the desired metal. Solvent extractions, while the method of choice, may be complicated further by poor solvent-mother liquid separation, solubility of the extractant in the mother or scrub solutions, multiple side streams of the desired metal, large volumes of aqueous solutions requiring treatment as well as toxicity or flammability of the organic extractant.

Ion exchange processes have been selectively incorporated into industrial precious metal recovery protocols but are of more limited use than solvent extraction processes and do not solve recovery and refining challenges. Ion exchange processes are typically equilibrium controlled and may not completely remove the desired metal. Ion exchange processes may also suffer from poor selectivity for precious metals which result co-extraction of other precious metals or from co-extraction of contaminants. Typically, ion exchange resins for precious metals are expensive, have relatively low capacity thus requiring large volumes, require large volumes of strip solutions to recover the desired metal and extracted metals often require additional purification.

Other chemical processes of precipitation and volatilization may be used in conjunction with solvent extraction and/ or ion exchange. Typically, these processes are used to remove selected elements from the mother liquid or to purify metals of insufficient purity.

Separation and recovery of rhodium is a particularly vexing problem. In typical current extraction processes, rhodium remains at the end after recovery of other platinum group metals. This has at least three disadvantages: rhodium is lost in the many sidestreams of upstream extractions, rhodium is locked up during recovery of other precious metals, and rhodium and iridium are often in the final solution and separation of these two metals is difficult by any known method.

In spite of much effort, rhodium recovery and refining remain a vexing problem. There are no known readily usable solvent extractants for rhodium. U.S. Pat. No. 5,201,942 proposed a solvent extractant for rhodium requiring complexing of Rh with a high molar excess of tin. The proposed solvent extraction process has distinct limitations: it presumes osmium and iridium have been removed by other methods, rhodium extraction is not quantitative and Rh must be further processed to remove tin which may be in a 10 times molar excess. Ion exchange processes for Rh recovery and purification on an industrial scale have likewise returned disappointing results or have been unsuccessful. By necessity, the industry largely utilizes tedious precipitation and dissolution methods to purify rhodium.

To meet the demand for precious metals, the industry is in need of a simpler, lower cost alternative to current practices that is capable of recovering precious metals from chemically diverse primary and secondary sources.

All the U.S. Patent references described above are incorporated by reference in their entirety for all useful purposes.

SUMMARY OF THE INVENTION

The present invention is directed to a hydrometallurgical process for the recovery of precious metals selected from the group consisting of platinum [Pt], palladium [Pd], rhodium [Rh], ruthenium [Ru], iridium [Ir]) and gold [Au] from base metals in an acidic aqueous halide solution. In the process, substituted quaternary ammonium salts are employed to precipitate precious metal(s) for separation. The stage at which various of the precious metals are precipitated depends on conditions in the solution.

In a first additional aspect of the present invention, dissolved precious metals are heated, refluxed or autoclaved in aqueous halide solutions comprising halogen acid, alkali metal or alkaline earth halides, substituted quaternary ammonium halide salt, and combinations thereof.

In a second additional aspect of the present invention, precious metals in the presence of substituted quaternary ammonium salts are oxidized to a higher oxidation state prefatorily to precipitation. This may be accomplished by the addition of chlorine to the solution.

In a third and separate additional aspect of the present invention, precious metals in the presence of substituted quaternary ammonium salts are reduced to a lower oxidation state prefatorily to precipitation. This may be accomplished by heating and then cooling the solution or by application of reducing agents.

In a fourth and separate additional aspect of the present invention, precious metals in the presence of substituted quaternary ammonium salts are separated from one another through differentials in solubility in one or more solvents.

In a fifth and separate additional aspect of the present invention, Rh, Ru and base metals are separated from Au, Pt, Pd Ir and Fe precipitates at ambient temperature in the presence of substituted quaternary ammonium salts.

In a further aspect of the present invention, any of the foregoing separate aspects are contemplated to be combined to greater advantage.

Thus, it is an object of the present invention to provide improved processes for the recovery of certain precious metals. Other and further objects and advantages will appear hereinafter.

BRIEF DESCRIPTION OF DRAWINGS

FIG. 2 is the Example B processing diagram.

DETAILED DESCRIPTION OF THE PREFERRED EMBODIMENTS

Figure 1:
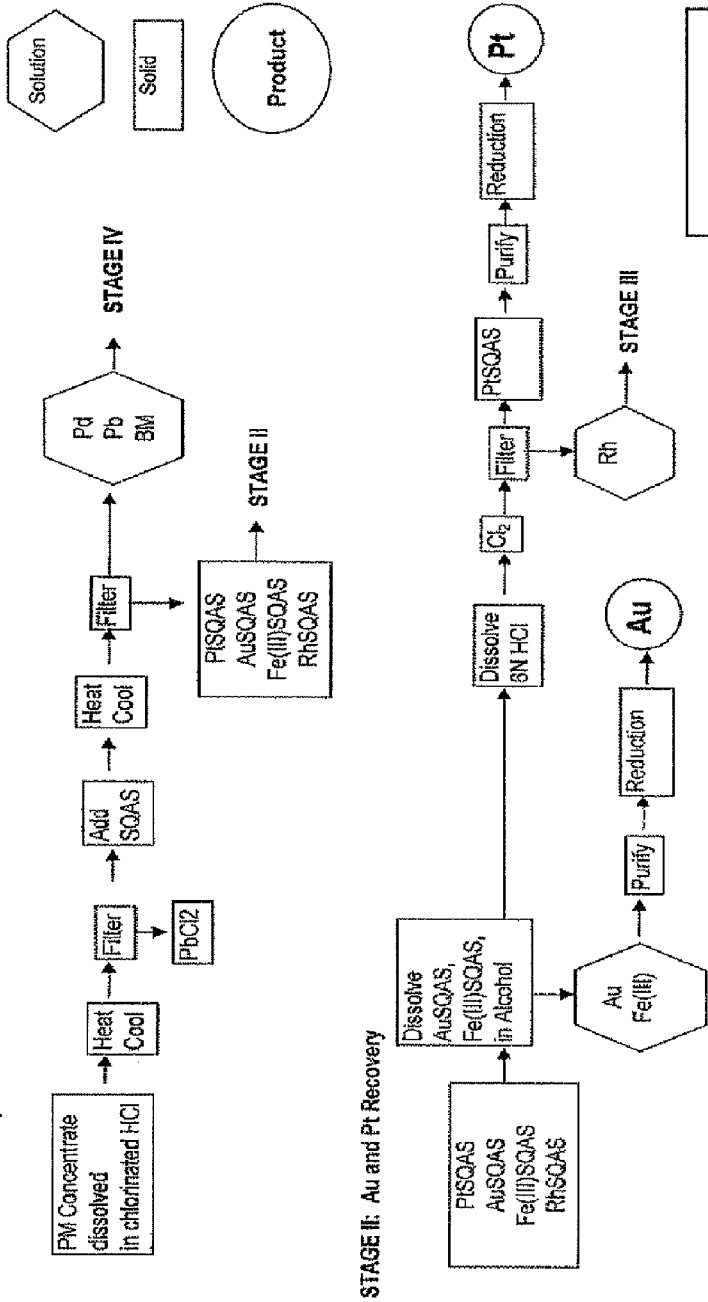
FIG. 1 is the Example A processing diagram.
Figure 1:
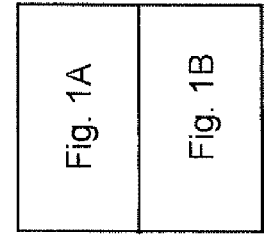

Disclosed are hydrometallurgical processes for recovery of the precious metals platinum [Pt], palladium [Pd], rhodium [Rh], ruthenium [Ru], iridium [Ir]) and gold [Au] (hereinafter PM singular and plural) from acidic halide aqueous solutions, separation of the PM from base metals and separation of the PM from one another into high-purity metals. Separation and recovery of Ag has not been investigated in detail but substantial amounts are recovered as a by-product of recovery and purification of the precious metals.

The PM source materials may be ores, spent catalysts, combustion catalytic converters, electronic scrap, medical wastes and others. The more chemically complex source materials often consist of mixtures of PM and base metals. Base metals comprise Ni, Co, As, Sb, Pb, Cu, Fe, Zn, Te, Se, S, Na, Ca, Mg, Al, Si, rare earth and other elements (hereinafter BM singular and plural). The concentrations are not of concern to the preferred processes. The PM and BM are to be dissolved in an acidic halide aqueous solution with or without an acid and an oxidant. In a preferred embodiment, the halogen acid is preferably hydrochloric acid due to low cost and widespread usage in the industry.

In a preferred embodiment, the PM are precipitated with substituted quaternary ammonium salt (hereinafter SQAS singular and plural). The SQAS, are described by a general formula: $H_{0-3}R_{4-1}NX$ where H=hydrogen, R=organic group, N=nitrogen and X=halide. Some of the desirable characteristics of the SQAS depending on the PM introduced to the process and the desired results are:
1. Solubility in water and acidic solutions;
2. Most BM remain in solution;
3. Formation of insoluble precipitates with most PM in selectable chemical environments;
4. Formation of PM precipitates with differing solubility depending on the PM oxidation state
5. Formation of PM precipitates with differing solubility depending on the SQAS concentration;
6. Formation of PM precipitates that are readily separated by appropriate methods and washed;
7. Formation of PM precipitates, a few of which are soluble in organic solvents.

Numerous substituted quaternary ammonium salts of precious metals have been synthesized and characterized, see J. W. Mellor, *a Comprehensive Treatise on Inorganic and Theoretical Chemistry*, Vol. XV (Longmans, London 1936). In the preferred processes, PM complexes of dimethylammonium chloride, trimethylammonium chloride, tetramethylammonium chloride, and tetraethylammonium bromide have been investigated. Other substituted quaternary ammonium salts conforming to the general formula with desired characteristics are likely to form suitable PM-SQAS complexes. Tetramethylammonium chloride is preferred because it meets desirable characteristics, is widely available, is of low cost and does not result in mixed halides in solution when added to PM liquors that are typically in hydrochloric acid.

PM recovery and refining comprising processes of heating, cooling, precipitation, dissolution, oxidation and reduction of SQAS complexes meets the objectives of separation of the PM from BM, separation of PM from one another and quantitative recovery in a rapid and lower cost method. Once PM-SQAS precipitation is accomplished, typically after cooling of a solution, in all cases discussed, precipitates are physically separated from filtrates by filtration, centrifugation, evaporation or other suitable method. Base metals remain in the filtrate in nearly all processes. In specific instances where BM-SQAS precipitates form, they are readily removed by dissolution in organic solvents comprising alcohols, dimethyl formamide and others except for Pb which is conveniently removed as described below. In addition, other advantages are evident:
1. PM-SQAS complexes precipitate rapidly and the precipitates are readily separated, washed and purified;
2. The process is flexible and a person skilled in the art can easily adjust the individual processes to accommodate feedstocks with different absolute and relative amounts of PM and BM;
3. The PM are divided into separate processing streams for parallel refining, thus reducing cross PM or BM contamination, side-stream PM slippage, cumulative losses from numerous sequential processes and refining time;
4. PM-SQAS complex precipitations are quantitative or nearly so with residual PM concentrations in filtrates being undetectable to low single-digit ppm levels by inductively coupled plasma spectrometry (ICP);
5. PM-SQAS complexes are readily purified and converted to solutions, salts or high purity metals by well-known methods;
6. Waste streams are minimized as reagents and byproducts are recyclable;
7. Metals remaining after precipitations, in washes and purifying treatments are readily and quantitatively recovered.

Although we cannot attest to any particular theorem, recovery and purification of PM utilizing SQAS appears to reduce inherent constraints imposed by thermodynamic and kinetic properties of PM in aqueous halide solutions that have long defied resolution. Speciation of PM in aqueous chloride media is particularly well known as compared to other halide media; albeit, speciation in other aqueous halide solutions is known. The relative abundance of chloro-aqua complexes is in part dependent on chloride ion concentration in the aqueous solution. In general, a higher chloride concentration increases species with a higher chloro- to aqua-ligand ratio and suppresses species with lower ratios. As one example, up to four chloro-aqua complexes of Rh can co-exist in the same solution; comparable speciation is known for the other PM. Speciation is believed to provide a significant challenge to chemical processing as well as to other current industrial processes. With the application of SQAS, it appears that PM speciation may be reduced sufficiently to allow eventual achievement of PM recovery and refining.

In a preferred embodiment, a minimum total chloride ion concentration in solution is that necessary to stoichiometrically form a full complement of chloro ligands on the PM (3 for Au(III); 4 for Pt(II) and Pd(II); 6 for Pt(IV), Pd(IV), Rh(III), Ru(III) and Ru(IV); and 1 for Ag). More preferably, chloride ion concentrations are substantially higher thus favoring PM-chloro complexes and may range up to saturation limits. Chloride ions may be derived different sources comprising hydrochloric acid, alkali metal salt, alkaline earth salt, substituted quaternary ammonium salts and combinations thereof.

In one embodiment PM are recovered, separated and refined in 6N HCl which has the added convenience of being able to recycle constant-boiling HCl; albeit, concentrated HCl may also be employed. In another embodiment, chloride originates from NaCl. For example, sufficient water is added to dissolve a mixture of products resulting from fusion of NaCl and Rh under $Cl_2$. Additional processing and precipitation of Rh-SQAS results in a filtrate with less than 10 ppm Rh. Comparable results have been achieved with other PM.

Thus, combined chloride background concentrations up to saturation are beneficial to the preferred processes. Although we have not investigated the effect of basic solutions in any detail, basic solutions even in the presence of chloride will degrade the process because some base metals and some PM will co-precipitate and contaminate desired products. For example, Pd-SQAS will not precipitate from a basic Pd solution.

Reaction kinetics is likely to also have an important role in precipitation of some PM-SQAS compounds, particularly those PM [e.g. Rh and Pt(IV)] with slow ligand exchange rates. As described above, chloro-aqua ligand exchange rates in aqueous chloride media vary as much as by a factor of $10^{12}$ for PM in the preferred processes. It is believed that even with high chloride concentration, the kinetics of chloro-aqua exchange can be sufficiently slow to preclude establishment of thermodynamic equilibrium between the chloro and aqua species within a time frame reasonable for an industrial process. Non-equilibrium PM speciation is believed to degrade effective precipitation of PM-SQAS complexes to near-quantitative levels. For example, precipitation of Rh from NaCl fusion under $Cl_2$ with SQAS in a saturated NaCl solution in which there is more than sufficient chloride to form a hexachloro species, results in precipitation of some Rh-SQAS; however, the Rh concentration in the filtrate exceeds 1,000 ppm.

Kinetic factors can be thermally reduced or nearly eliminated as needed for PM-SQAS precipitations that do not reduce PM concentrations to acceptable levels in the residual solution. PM dissolved in aqueous chloride solution is heated to boiling or reflux and allowed to react for hours or a few days for convenience; however, heating to lower temperatures for longer periods of time or to higher temperatures for shorter periods of time up to the stability limit of SQAS in an autoclave are acceptable. In one embodiment, PM are thermally treated in aqueous chloride solutions. For example, in the cited initial precipitation of Rh-SQAS from a NaCl-fusion solution, the Rh concentration in the filtrate exceeds 1,000 ppm. Heating to reflux, cooling and Rh-SQAS precipitation for about 24 hours results in near-quantitative Rh-SQAS precipitation with residual Rh concentration in the filtrate of less than 10 ppm. In another embodiment, PM are thermally reacted in the presence of SQAS which likewise appears to promote reaction kinetics and significantly improve quantitative PM-SQAS precipitation.

Although precise knowledge of PM speciation in aqueous chloride solutions and the mechanisms for overcoming reaction kinetics are not fully known, a combination of sufficiently high chloride concentration and thermal processing as necessary predictably and reliably results in recovery and purification of PM.

The identity of the PM-SQAS compounds (or complexes) resulting from reaction between a PM element and SQAS have not been precisely determined. Rather we refer to the compound(s) as PM-SQAS complexes and individual complexes such as for rhodium as Rh-SQAS. The composition of individual PM-SQAS complex precipitates may in themselves be mixtures of several different complexes depending on whether they are mono- or bi-nuclear PM complexes, chloro-aqua variants or other factors. Typically, metal assay amounts in isolated PM-SQAS complexes do not precisely match known end-member compositions or may vary slightly in excess of analytical uncertainty between different precipitations of the same PM-SQAS. In spite of imprecise knowledge of the PM-SQAS complexes, they predictably and reliably form under the same reaction conditions and predictably and reliably respond to differing chemical treatments designed to efficiently recover and refine PM.

The preferred processes utilize the physical and chemical properties of PM in relation to one another and to BM in various forms with SQAS. PM-SQAS and PM solutions can be thermally and chemically manipulated in aqueous solutions or in the solid state to achieved desired outcomes such as high recovery and high-purity products in a short time period at relatively low cost.

The solubilities of PM in the presence of SQAS and PM-SQAS are dependent on a number of factors comprising element identity, oxidation state, thermal history, SQAS concentration and solvent composition. Solubility characteristics of the PM-SQAS complexes for one SQAS composition are summarized in Table 1. Tetramethylammonium chloride is exemplary and is shown only because of a robust data base. The table is not comprehensive, but is representative of some of the variation in solubility as a function of element identity, oxidation state, thermal history, SQAS concentration and solvent composition for the PM and tetramethylammonium chloride. A person skilled in the art can vary solvent type, SQAS concentration, SQAS composition within the range of the general formula, thermal history and oxidation state to make a comparable data base and then devise a series of process steps relative to solubility and insolubility of desired elements to recover, separate and purify PM from one another and from BM.

TABLE 1

Solubility of Tetramethylammonium Chloride (SQAS) Complexes

| SOLVENT | Water/HCl | Water/HCl | Water/HCl | Water/HCl | Water/HCl |
|---|---|---|---|---|---|
| Wt. % SQAS | 5 | 5 | 5 | 5 | 5 |
| Inferred Oxidation State | Reduced | Reduced | Reduced | Oxidized | Oxidized |
| Heated with SQAS | NO | YES | YES | NO | YES |
| Solubility | Soluble Base metals Pd(II) Pt(II) Rh(III) Ru(III) Ir(III) Pb(II) | Soluble Base metals Pd(II) Pt(II) Rh(III) Ru(III) Ir(III) Pb(II) | Insoluble | Soluble Most base metals Au(III) Rh(III) | Insoluble Fe(III) Au(III) Pd(IV) Pt(IV) Ru(IV) Ir(IV) Pb(IV) |

| SOLVENT | Water/HCl | Water/HCl | Water/HCl | Alcohol | Alcohol |
|---|---|---|---|---|---|
| Wt. % SQAS | 5 | 20 | 20 | 0 | 0 |
| Inferred Oxidation State | Oxidized | Oxidized | Oxidized | | |
| Heated with SQAS | YES | YES | YES | Not applicable | Not applicable |
| Solubility | Soluble Most base metals Ru(III) | Soluble Most base metals | Insoluble Fe(III) Au(III) Pd(IV) Pt(IV) Rh(III) Ru(IV) Ir(IV) Pb(IV) | Soluble Fe(III) Cu(II) Au(III) | Insoluble Pd(IV) Pt(IV) Rh(III) Ru(IV) Ir(IV) Pb(IV) |

For PM elements with multiple oxidation states, the inferred oxidation state has a profound effect on solubility (Table 1). Pt-SQAS, Pd-SQAS, Ir-SQAS and Ru-SQAS are generally soluble in a lower oxidation state and insoluble in a higher oxidation state. The oxidation states are inferred based on application of well-known oxidizing or reducing agents or by alteration of reducing or oxidizing conditions. Most oxidation and reducing reactions are, reversible suggesting oxidation or reduction rather than other factors such as unspecified chemical changes in PM-SQAS composition or structure. For example, if Pt, Pd, Ir and Ru in refinery liquors or solutions derived from dissolving the PM concentrates are in the lower oxidation state, they can be oxidized to a higher oxidation state with strong oxidants comprising chlorine, hydrogen peroxide or others. Chlorine is preferable because the four elements in higher oxidation states are generally insoluble. Increasing the chloride background during chlorine oxidation will maintain or decrease the solubility of the oxidized PM-SQAS complex. Oxidized insoluble Pb-SQAS and Pd-SQAS may be reduced to soluble PM by application of known reducing agents or refluxing. Soluble Pd and Pb in SQAS solutions can be reversibly oxidized subsequently with oxidants to insoluble Pb-SQAS or Pd-SQAS.

The insolubility of oxidized Pt-SQAS, Pd-SQAS, Ir-SQAS, and Ru-SQAS complexes as compared to the SQAS complexes of the same metals in reduced states provides an effective mechanism for separating the four metals from one another. Those skilled in the art can effect selective oxidation or reduction of one or more of the four metals. For example, boiling Pt-SQAS, Pd-SQAS, Ir-SQAS, and Ru-SQAS in water or acidic aqueous solution is known to be sufficient to reduce and solubilize Pd whereas the other three PM-complexes remain insoluble. Platinum and iridium may be separated by selective reduction of iridium. Sodium nitrite sufficient to reduce Ir is added to insoluble oxidized Pt-SQAS and Ir-SQAS co-precipitates in aqueous SQAS solution. Iridium reacts rapidly with the $NaNO_2$ and becomes soluble while platinum does not react and remains as insoluble Pt-SQAS.

The lack of higher oxidation states for Rh and Au in typical embodiments of the preferred processes may also be used to great advantage, particularly for separation, recovery and purification of Rh. In one embodiment, aqueous chloride solutions of Rh contain Pt, Pd, Ir, and Ru as well as SQAS in stoichiometric excess. Oxidation, preferably with $Cl_2$, elevates Pt, Pd, Ir and Ru to higher oxidation states with subsequent precipitation of their SQAS salts whereas Rh remains in solution and is separable. Conversely in another embodiment, Rh may be dissolved in acidic solutions (6N HCl for convenience) whereas insoluble oxidized PM-SQAS precipitates persist and are separable. In this embodiment, the highest value metal, rhodium, may be recovered and refined early in the process rather than near the end of current industrial processes.

In a typical embodiment, oxidation has very little effect on the solubility of most BM in the presence of SQAS. Most BM are soluble in both low and higher oxidation states and are readily separated from insoluble PM-SQAS precipitates. In some applications, however, the presence of Pb(IV) and Fe(III) may result in insoluble Pb(IV)-SQAS and Fe(III)-SQAS precipitates as well as those of desired PM (Table 1). Specific procedures can be incorporated to separate them from oxidized PM precipitates.

Pb(IV)-SQAS is a likely but undesirable co-precipitate along with Rh-SQAS, Au(SQAS), Pt-SQAS, Fe(III)-SQAS and Pd-SQAS upon addition of a SQAS to a solution derived from dissolution of lead-bearing PM concentrates in chlorinated hydrochloric acid; however, lead co-precipitation can be greatly reduced or nearly eliminated. Prior to addition of SQAS, an acidic halide solution derived from dissolution of the PM concentrate is heated to boiling at about 110° C. for about 24 hours. SQAS in stoichiometric excess of that required to precipitate Au-SQAS, Pt-SQAS, Rh-SQAS and Fe(III)-SQAS is added and refluxed for an additional 24-72 hours at about 110° C. before cooling. Au-SQAS, Pt-SQAS, Rh-SQAS and Fe(III)-SQAS quantitatively precipitate, but Pb and Pd remain in solution, presumably because boiling decomposes the higher oxidation states of Pd and Pb. Soluble Pb, Pd and BM are readily separated from PM-SQAS.

Fe(III)-SQAS precipitates are separable from desired PM-SQAS. Fe(III)-SQAS are soluble in organic solvents comprising alcohols, dimethyl formamide and others and may be washed from insoluble PM-SQAS. In feedstocks containing gold, Au-SQAS may co-precipitate with Fe(III)-SQAS. Au-SQAS is generally soluble in the same organic solvent as Fe(III)-SQAS; however, Au may be separated from Fe by methods (e.g. oxalic acid) well-known to those skilled in the art.

The thermal history and composition of aqueous halide solutions provides additional mechanisms for separating the PM from one another. In one preferred embodiment, a 6N HCl solution containing Rh, Ru and other PM is heated to about 110° C. for about 24 hours or more as a first step in the process. Alternatively, the solution may be heated for longer time at lower temperature or higher temperature in an autoclave for shorter time. After initial heating and cooling, SQAS is added in slight excess of that needed to precipitate Pt- SQAS, Pd-SQAS, Au-SQAS, Ir-SQAS and Fe(III)-SQAS, approximately 2-3 moles of SQAS/mole PM. Oxidizing the resulting slurry with chlorine results in quantitative precipitation of Pt-SQAS, Pd-SQAS, Au-SQAS, Ir-SQAS and Fe(III)-SQAS without affecting Rh, Ru or BM Precipitates are separated from the filtrate which contains soluble Rh, Ru and BM.

Separation of Rh, Ru from BM in a halide solution such as that from directly above illustrates a different embodiment in which heating with SQAS allows for separation of the two PM from one another and from BM. Unoxidized Ru, Rh, BM solution is heated with SQAS at about 110° C. for 24-72 hours. Rh-SQAS precipitation upon later cooling is more nearly quantitative when SQAS is present at concentrations up to the saturation limit and about 60 ml of 50% NaOH/liter of are added prior to heating. Rh-SQAS is physically separated from the Ru and BM solution. The Ru and BM solution is oxidized, preferably with $Cl_2$. Ru is oxidized and forms a Ru-SQAS precipitate that is separated from the BM solution.

Differences in PM-SQAS solubilities in various solvents depend on solvent composition, element and element oxidation state (Table 1). The solubility differences may be taken full advantage of in separating select PM from one another, PM from BM or washing of impurities from precipitates. For example, Au-SQAS, Fe(III)-SQAS and Cu(II)-SQAS are soluble in organic solvents comprising methanol, ethanol, dimethyl formamide and others. The organic solvent is used to separate soluble Au, Fe(III) and Cu(II) from the other PM-SQAS complexes that remain insoluble.

The solubility of PM-SQAS in aqueous halide solutions varies with the SQAS concentration which is useful for separation of PM from one another or from BM. In one embodiment, PM-SQAS including Rh-SQAS are precipitated after heating and cooling. After separation of the PM-SQAS precipitates, residual BM solutions contaminate the precipitates. Residual BM solution is washed from the precipitates with an aqueous halide solution containing up to 30 weight % SQAS. BM remain soluble and are washed from the precipitates; however, the high SQAS concentration precludes dissolution of the desired PM-SQAS. In another embodiment, Rh is in solution and contaminates PM-SQAS precipitates. To wash Rh from the precipitates, an aqueous halide wash solution with 5-10 weight % SQAS has insufficient SQAS to precipitate Rh-SQAS but sufficient SQAS to preclude dissolution of less soluble PM-SQAS complexes.

Although the preferred processes generally produce intermediate SQAS products of high-quality or purity, industry standards require metals of exceptionally high purity (99.95% or greater) that can be achieved only with additional purification of intermediate PM-SQAS complexes before conversion to final products. Purification of precipitates such as PM-SQAS are well known to those skilled in the art and comprise dissolution and filtration, recrystallization, dissolution and reprecipitation, dissolution and oxidation, dissolution and precipitation from solutions adjusted to basic by addition of NaOH as well as others. Several specific purification methods are described in the examples below.

Depending on need, industrial applications may call for elemental metal, solutions or salts. PM-SQAS complexes can be readily processed to the appropriate final products. For example, high-purity metal sponges can be produced by well-known reduction methods. Solubilized PM-SQAS in aqueous solutions can be reduced to metal sponge with reducing agents comprising hydrazine, sodium borohydride, sodium nitrite, hydroxylamine and others. Alternatively, metal sponges may be recovered by pyrolysis of a purified PM-SQAS.

For other industrial needs, PM solutions or PM salts are more desirable. PM-SQAS complexes are readily converted to soluble metal solutions or soluble salts. Purified PM-SQAS are converted to insoluble hydroxides with an alkali metal hydroxide (e.g. NaOH). The PM-hydroxide precipitate is separated and water washed to remove SQAS and other soluble materials. The high purity PM hydroxides are then treated with a suitable acid, e.g. hydrochloric for chloride salts, nitric acid for nitrate salts, etc., to convert the hydroxides to soluble metal salts. The conversion is very advantageous since many if not most of these PM are used as soluble salts in the manufacture of catalysts and the like. Furthermore, converting metals like Ir and Ru to metal salts is far preferable because Ir and Ru metals are extraordinarily difficult to dissolve and their uses are principally as soluble salts.

Finally, the rate of PM recovery is critical to any refining system. In the preferred processes, recovery of PM is quantitative or nearly quantitative within analytical limits after first pass processes combined with recycle recovery. First pass and recycle recovery of PM in the two Examples described below (Table 2) illustrate the desired high recovery rate.

TABLE 2

| Percent Recovery of PM | | | | | |
|---|---|---|---|---|---|
| Rh | Au | Pt | Pd | Ru | Ir |
| Example A | | | | | |
| First Pass | | | | | |
| 95 | 65 | 95 | 95 | Not applicable | Not applicable |
| Recycle | | | | | |
| 5 | 35 | 5 | 5 | | |
| Example B | | | | | |
| First Pass | | | | | |
| 98 | 96 | 95 | 98 | 97 | 97 |
| Recycle | | | | | |
| 2 | 4 | 5 | 2 | 3 | 3 |

First pass represents the percentage of each metal recovered and refined to good delivery metal from initial separations and precipitations of PM-SQAS. Recycle recovery represents the percentage of each PM recycled by capturing washes, recrystallization liquors, and the like. These PM values are recaptured by distilling off excess solvent and recycling the reduced volumes containing $H_2O$, HCl, SQAS, and PM either to the initial PM-SQAS precipitation or to the initial PM dissolution, thus ensuring almost complete capture of the PM. On average, about 95% of the total PM present are captured and purified in the initial precipitation stage requiring a 2 week period. The much smaller recycle component is returned to the next batch and is eventually recovered in a total of 4 weeks. In the case of Pd, some remains in the lead precipitate and is returned to the initial PM dissolution stage.

Preferred embodiments will now be described by way of examples. Using information in Table 1, the description above, and the examples below, one skilled in the art will be able to adapt the process procedures described to accommodate source materials different from the examples presented.

Example A

Several 200 gram samples of PM bearing solids with BM from two lots were refined as diagrammatically illustrated in FIG. 1. Typical conditions and results for those runs are summarized in Table 3.

TABLE 3

Average Metal Concentrations in Two Lots of Example A

| Stage | Material | Rh | Pd | Pt | Au | Cu | Fe | Pb | Ag | Ni |
|---|---|---|---|---|---|---|---|---|---|---|
| I | Initial | 2,500 | 30,800 | 23,000 | 530 | 10,700 | 8,900 | 6,000 | 960 | 5,500 |
| III | Rh feed | 20,740 | nd | nd | nd | 10,000 | 8 | | 16 | |
| IV | Pd-Pb feed | 28 | 30,640 | 1,500 | nd | 2 | 3,100 | 5,200 | 900 | 5,200 |

In Stage I, solids were slurried in about 1 liter of 6N HCl at 110° C. with addition of sufficient $Cl_2$ to dissolve PM. After cooling, non-essential solids and $PbCl_2$ were separated by filtration. The filtered solution was refluxed at about 110° C. for about 24 hours, yielding a solution shown in Table 3 as Stage I. 300 grams of SQAS, tetramethylammonium chloride by choice, was added and refluxed at about 110° C. for about an additional 24 hours. The refluxed solution was allowed to cool to room temperature for about 24 hours or more which resulted in a slurry. If excess SQAS precipitated along with PM-SQAS, it did not interfere with subsequent processing. The slurry was separated by filtration into solids containing combined precipitates of Pt-SQAS, Au-SQAS, Fe(III)-SQAS and Rh-SQAS and into a filtrate containing Pd, Pb and BM. The precipitates were sent to Stage II processing and the filtrate was sent to Stage IV processing.

The Stage II combined precipitates of Pt-SQAS, Au-SQAS, Fe(III)-SQAS and Rh-SQAS were washed in a filter funnel with about 1 liter of alcohol (methanol) to dissolve and elute Au, Fe, Cu and SQAS. The final wash solution was not visibly colored. The wash solution contained less than 1 ppm Pt and Rh, and a few ppm of Pd. Au was recovered from the alcohol by methods well known to those skilled in the art (e.g. sparging with $SO_2$) and separation of elemental gold from the solution. Au recovery was quantitative within analytical limits and purity was 99.9%.

The Stage II alcohol-insoluble Pt-SQAS and Rh-SQAS precipitate was dried at 110° C. to evaporate residual alcohol. The dried precipitate was dissolved with stirring in about 100 ml of 6N HCl to dissolve Rh-SQAS. The solution was sparged with $Cl_2$ for 75 minutes to effect complete precipitation of Pt-SQAS and other trace elements. The slurry was separated by filtration into Pt-SQAS and a filtrate containing Rh that was sent to Stage III for Rh recovery. The Pt-SQAS precipitate was purified by dissolving in sufficient (about 750 ml) boiling $H_2O$ or 6N HCl to dissolve Pt-SQAS. The solution was filtered while hot to remove any insoluble material which is composed chiefly of contaminants. The purified filtered Pt solution was cooled and allowed to recrystallize overnight or longer. Purified Pt-SQAS was separated by filtration. The filtrate, containing residual soluble Pt as well as contaminants, was reduced to about 25% of original volume, cooled, and filtered to separate high-purity Pt-SQAS from soluble contaminants. The purified Pt-SQAS from the initial precipitation and volume reduction was reduced by methods well known to those skilled in the art (e.g. pyrolysis at about 600° C.). Pt recovery was about 95% with a purity of 99.9%. The unrecovered Pt was recycled into the next batch of Pt-SQAS re-crystallization or to the initial precipitation of PM-SQAS for ultimate recovery.

Rh was recovered from highly concentrated Stage III solution (Table 3) which also contained dissolved SQAS. Approximately 60 ml of 50% NaOH per liter of solution was added and then sufficient SQAS was added (about 20 weight %) to saturate the solution at ambient temperature. The solution was heated to about 110° C. for 24 hours or more. Rh-SQAS was allowed to precipitate, typically for about 24 hours, until the Rh concentration in the solution reached a constant. Rh-SQAS and filtrate were separated. The Rh-SQAS was purified by dissolving in a barely sufficient amount of boiling water (about 20 weight %) and separating insoluble contaminants from the Rh solution. The purified Rh solution contained soluble trace impurities of Ag, Pt and other contaminants. The pH of the solution was adjusted to about pH8 with NaOH to effect precipitation of $Rh(OH)_3$ over about 24 hours. $Rh(OH)_3$ was separated from the solution and washed with an appropriate amount of alkaline water or alcohol to remove soluble contaminants. The purified $Rh(OH)_3$ was dissolved in a minimum amount of HCl and then reduced to metal by methods well known to those skilled in the art (e.g. hydrazine). Overall yield was about 95% with a final purity of 99.9%. Unrecovered Rh was recycled into the next batch.

Palladium was recovered in Stage IV that began with the Pd, Pb and BM solution from Stage I (Table 3). The solution was sparged with $Cl_2$ for about 1 hour to effect quantitative co-precipitation of insoluble oxidized Pd-SQAS and Pb-SQAS. The combined precipitate was separated from soluble BM by filtration. Methods for separating Pd and Pb are well known to those skilled in the art, but for convenience the Pd-SQAS and Pb-SQAS co-precipitates were dissolved in 5% aqueous ammonia. Palladium formed soluble ammonia complexes whereas lead formed insoluble compounds that were readily separated. The soluble Pd-ammonia complex was precipitated by the well-known method of adding HCl to form the dichlorodiamminopalladium precipitate that was separated from the ammonia solution. The water-washed Pd salt typically was of sufficient purity to proceed; albeit, a second ammonia dissolution and crystallization of dichlorodiamminopalladium may be preferred. Reduction of dichlorodiamminopalladium to palladium metal is well known to those skilled in art (e.g. pyrolysis). Overall recovery of Pd was 95% with a purity of 99.98%. Residual Pd in solutions was recovered (e.g. sodium borohydride) and recycled to the initial PM dissolution.

Example B

A hydrochloric acid solution of highly concentrated PM elements and BM was treated for PM recovery and refining as schematically illustrated in FIG. 2. This material differs from Example A primarily by the additional presence of Ru and Ir.

TABLE 4

Average Metal concentrations of starting solution in Example B

| Rh | Pd | Pt | Au | Cu | Fe | Ir | Ru |
|---|---|---|---|---|---|---|---|
| 40,000 | 2,000 | 4,000 | 400 | 20,000 | 20,000 | 5,000 | 30,000 |

Rhodium, ruthenium and base metals were separated from other PM in Stage I. Seventy grams of liquor was heated at about 110° C. for about 36 hours and then allowed to cool to room temperature. 12 grams of SQAS (tetramethylammonium chloride) was dissolved in the solution. The solution was sparged with Cl$_2$ for about 70 minutes. Au-SQAS, Pt-SQAS, Pd-SQAS, Ir-SQAS and Fe(III)-SQAS precipitated whereas Rh, Ru and BM remained soluble. The precipitate was separated from the filtrate. The Rh, Ru and base metal filtrate was sent to Stage II and Stage III for sequential recovery of Ru and Rh. The precipitates were sent to Stage IV and Stage V for recovery of the other PM.

Stage I filtrate with Rh, Ru and BM was processed to separate the two PM from one another and BM in Stage II. 40 grams of SQAS (tetramethylammonium chloride) was dissolved in the filtrate. The solution was heated for about 24 hours at about 110° C. and then allowed to cool to room temperature over a period of 24 hours or more. Ru-SQAS and Rh-SQAS precipitated from the solution and were separated from the filtrate containing soluble BM. The Rh-SQAS and Ru-SQAS co-precipitates were dried and then washed with alcohol (methanol) to remove soluble Fe(III)-SQAS as well as residual soluble BM. The co-precipitate was then dissolved in 6N HCl sufficient to dissolve Rh-SQAS which typically has a solubility of about 15 weight %. The solution was sparged with Cl$_2$ for about 40 minutes to assure thorough oxidation of Ru and precipitation of Ru-SQAS. Ru-SQAS was separated from the filtrate containing soluble Rh. The filtrate containing soluble Rh was sent to Stage III for Rh recovery. Solid Ru-SQAS remaining after removal of the Rh-SQAS had a purity exceeding 99% and an overall yield of 97%.

Rh was recovered in Stage III. The process did not significantly differ from that in Stage III in Example A. Recovered Rh purity was 99.9% and yield was 98%.

The Au-SQAS, Pt-SQAS, Pd-SQAS, Ir-SQAS and Fe(III)-SQAS co-precipitates from Stage I were processed in Stage IV to remove soluble Au-SQAS and Fe(III)-SQAS from insoluble Pt-SQAS, Pd-SQAS and Ir-SQAS. The co-precipitate with all five elements was dried and then mixed in about 150 ml of alcohol (methanol). Soluble Au and Fe were separated from insoluble Pt-SQAS, Pd-SQAS and Ir-SQAS. For convenience, Au was recovered from the filtrate by sparging with SO2 and separating particulate Au. The Au yield was 96% with a purity of 99.9%.

The alcohol-insoluble Pt-SQAS, Pd-SQAS and Ir-SQAS co-precipitates were then processed in Stage IV to recover Pd and separate Pd from Pt and Ir. The co-precipitates were added to about 100 ml of 6N HCl with about 15 weight % SQAS (tetramethylammonium chloride) and boiled at about 110° C. for 24 hours. Boiling of the slurry resulted in solubilization of Pd. Pt-SQAS and Ir-SQAS dissolution was suppressed by the presence of SQAS. The Pd filtrate was separated from Pt- and Ir-SQAS. The Pd filtrate was contaminated with trace amounts of Pt and Ir and was further purified. The pH of the Pd filtrate was adjusted to 8 with 50% NaOH to precipitate Pd(OH)$_2$. The Pd(OH)$_2$ was water washed to remove trace amounts of soluble Pt and Ir salts. Purified Pd(OH)$_2$ was then reduced to metal by methods well known to those skilled in the art (e.g. HCl dissolution and hydrazine reduction). The Pd yield was 98% and purity was 99.9%.

In Stage V recovery of Pt and Ir, Pt-SQAS and Ir-SQAS co-precipitates were slurried with 50 ml of a water solution that was 20 weight % SQAS. 2.5 grams of NaNO$_2$ were dissolved in the solution and allowed to react for less than 1 hour. Iridium was solubilized whereas Pt-SQAS remained as a solid. The Ir filtrate and Pt-SQAS were then separated. The Ir filtrate was purified by acidifying with sufficient HCl to re-precipitate Ir-SQAS which was separated from the filtrate containing Pt. The process of Ir-SQAS precipitation, NaNO$_2$ dissolution and re-precipitation was repeated to remove impurities and resulted in highly purified Ir-SQAS. For convenience, Ir-SQAS was pyrolized at 600° C. Overall yield was 97% with 99.9% purity.

Pt-SQAS remaining after Ir recovery in Stage V was purified by dissolution in 15 ml of 6N HCl at about 110° C., volume reduction to 5 ml, and cooling to ambient temperature. Pt-SQAS was separated from the filtrate and for convenience was reduced by pyrolysis at 600° C. Overall yield for Pt was 95% with a purity of 99.9%.

Thus, a hydrometallurgical process for the recovery, separation and purification of metals selected from the group consisting of platinum [Pt], palladium [Pd], rhodium [Rh], ruthenium [Ru], iridium [Ir]) and gold [Au] is disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A hydrometallurgical process for the recovery of metals selected from the group consisting of platinum [Pt], palladium [Pd], rhodium [Rh], ruthenium [Ru], iridium [Ir]) and gold [Au] (PM) comprising
separating at least one of the PM from base metals in an acidic halide aqueous solution by precipitating the at least one PM using substituted quaternary ammonium salt (SQAS);
removing the precipitate from the solution.

2. The process of claim 1, (SQAS) being $H_{0-3}R_{4-1}NX$ where H=hydrogen, R=organic group, N=nitrogen and X=halide.

3. The process of claim 1, SQAS being tetramethylammonium chloride.

4. The process of claim 1, the acidic aqueous solution being hydrochloric acid.

5. The process of claim 1, the at least one PM including Pd, separating the at least one PM including precipitating Pd as Pd-SQAS, the process further comprising
adding the removed Pd-SQAS precipitate to water or acid;
boiling the water or acid to solubilize precipitated Pd-SQAS;
removing any remaining precipitate.

6. The process of claim 5, the at least one PM further including Pt and Ir, separating the at least one PM including precipitating Pt and Ir as Pt-SQAS and Ir-SQAS, the process further comprising
slurrying the remaining Pt-SQAS and Ir-SQAS precipitates in water;
adding NaNO$_2$;
removing Pt-SQAS precipitate;
precipitating Ir-SQAS with hydrochloric acid.

7. The process of claim 1, the SQAS being soluble in an acidic halide aqueous solution.

8. A hydrometallurgical process for the recovery of metals selected from the group consisting of platinum [Pt], palladium [Pd], rhodium [Rh], ruthenium [Ru], iridium [Ir]) and gold [Au] (PM) comprising
separating at least one of the PM from base metals (BM) in an acidic halide aqueous solution including heating the solution and, after the heating, adding substituted quaternary ammonium salt (SQAS) to precipitate the at least one PM from the solution;
removing the precipitate from the solution.

9. The process of claim 8, separating further including oxidizing the solution after adding the SQAS.

10. The process of claim 9, removing the precipitate from the solution including filtering BM and at least one of soluble Rh, Ru from at least one of insoluble Au-SQAS, Pt-SQAS, Pd-SQAS, Ir-SQAS and Fe(III)-SQAS.

11. The process of claim 9, oxidizing being with chlorine.

12. The process of claim 8, the SQAS being soluble in an acidic halide aqueous solution.

13. A hydrometallurgical process for the recovery of metals selected from the group consisting of platinum [Pt], palladium [Pd], rhodium [Rh], ruthenium [Ru], iridium [Ir]) and gold [Au] (PM) comprising
   separating at least one of the PM from base metals (BM) in an acidic halide aqueous solution including adding substituted quaternary ammonium salt (SQAS) and heating the solution containing the at least one PM and SQAS to precipitate the at least one PM from the solution;
   removing the precipitate from the solution after separating the at least one PM.

14. The process of claim 13, separating further including oxidizing all metals with multiple oxidation states to the highest oxidation state of each in the acidic aqueous solution after adding the SQAS.

15. The process of claim 14, oxidizing being with chlorine.

16. The process of claim 13, the at least one PM including Au, the process further comprising
   washing the removed precipitate with an organic solvent sufficient to remove the Au from the precipitate.

17. The process of claim 13, the at least one PM including Rh, further comprising
   dissolving the removed precipitates with acidic aqueous solution;
   precipitating dissolved PM with multiple oxidation states from the dissolved removed precipitates by oxidizing the acidic aqueous solution;
   separating Rh solution from the precipitated dissolved PM.

18. The process of claim 13, the BM including lead [Pb] and the solution including chlorine, the process further comprising
   boiling the initial acidic aqueous solution of metals to precipitate $PbCl_2$;
   removing the $PbCl_2$ precipitate before adding the SQAS, adding the SQAS being in excess of that required to precipitate the at least one PM.

19. The process of claim 18, the PM including Pd, the process further comprising
   precipitating both Pb-SQAS and Pd-SQAS from the filtrate with SQAS by oxidation;
   dissolving the Pd-SQAS with ammonia and separating the Pd-SQAS from insoluble Pb compounds.

20. The process of claim 13, the SQAS being soluble in an acidic halide aqueous solution.

* * * * *